No. 652,854. Patented July 3, 1900.
A. MARUBIO.
COCK OR FAUCET.
(Application filed Jan. 6, 1900.)
(No Model.)
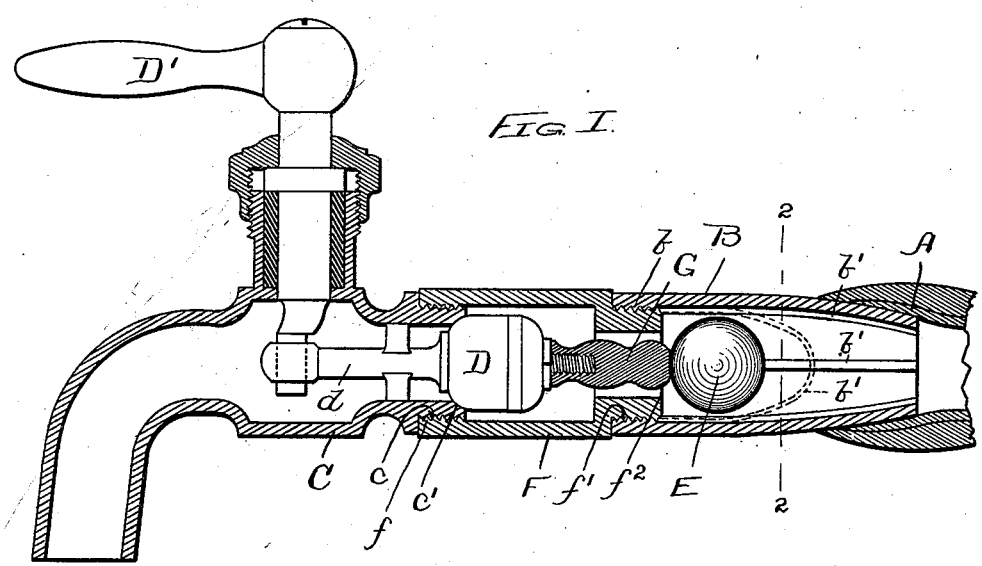
Fig. I.
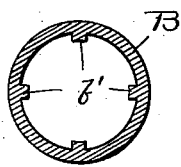
Fig. 2.
WITNESSES:
Lew. C. Curtis
H. W. Munday
INVENTOR:
Angelo Marubio
BY Munday, Evarts & Adcock
HIS ATTORNEYS.

UNITED STATES PATENT OFFICE.

ANGELO MARUBIO, OF CHICAGO, ILLINOIS, ASSIGNOR TO HIMSELF AND DOMINICK ROCCA, OF SAME PLACE.

COCK OR FAUCET.

SPECIFICATION forming part of Letters Patent No. 652,854, dated July 3, 1900.

Application filed January 6, 1900. Serial No. 534. (No model.)

*To all whom it may concern:*

Be it known that I, ANGELO MARUBIO, a citizen of the United States, residing in Chicago, in the county of Cook and State of Illinois, have invented a new and useful Improvement in Cocks or Faucets, of which the following is a specification.

My invention relates to improvements in cocks and faucets.

Heretofore in order to repack or repair a cock or faucet it has been necessary before unscrewing or removing it to shut off the water-supply by turning the shut-off valve in the main water-supply pipe leading to the building or apartment, thus causing great inconvenience and annoyance and generally rendering it necessary to call in the assistance of a plumber, even where all that is required is simply to repack a valve. Sometimes to avoid this great annoyance and inconvenience the pipe leading to each faucet or cock is provided with its own separate shut-off valve, but this adds very materially to the original plumbing bill or cost of construction, and even where such separate shut-off valves are provided they frequently become stuck or corroded fast from infrequent use, so that they cannot be turned without wrenching the lead pipe from its fastenings or injuring it.

The object of my invention is to provide an efficient and durable construction of cock or faucet by which the difficulties and objections heretofore experienced may be overcome and which will itself operate to automatically close the water-pipe to which the cock or faucet is attached by the mere act of unscrewing or removing it from said pipe and which at the same time will be of a simple and cheap construction, so that no material addition will be made to the cost of manufacture.

A further object is to so construct my invention as to enable it to be readily applied to cocks or faucets already in use.

My invention consists in the means I employ to accomplish these results—that is to say, it consists, in connection with a cock or faucet of any ordinary or suitable construction and having a removable shell screw-threaded to the hollow stem or base-piece that connects with the water-pipe, of a supplemental valve, preferably a ball-valve, which is caused or permitted to seat itself and close the pipe by the act of unscrewing or removing the portion of the cock or faucet carrying the main valve, and which supplemental valve is prevented from so seating itself and closing the pipe by an extension or projection on or engaged by the removable portion of the cock or faucet or some part thereof when the same is screwed home or in place. For convenience I provide the cock or faucet with a supplemental hollow stem or thimble, in which I form the seat for the supplemental valve or ball, the supplemental hollow stem or thimble being screw-threaded to the ordinary or customary hollow stem or base-piece of the cock or faucet and the shell of the cock or faucet screw-threaded to the supplemental hollow stem or thimble. The extension or projection which engages the ball or supplemental valve to hold it normally open or unseated may be connected to any suitable part of the removable portion of the cock or faucet; but I prefer to connect it to the valve or valve-stem instead of directly to the removable screw-threaded shell.

In the accompanying drawings, forming a part of this specification, I have for convenience illustrated my invention as applied to an ordinary faucet of the well-known "Fuller" type; but it will be understood by those skilled in the art that it may be readily applied to faucets and cocks of all different kinds of constructions.

In the drawings, Figure 1 is a central longitudinal section, and Fig. 2 is a cross-section on line 2 2 of Fig. 1.

In the drawings, A represents a water or other pipe, and B the customary hollow stem or base-piece of a cock or faucet which is soldered or otherwise connected to the water-pipe and which is provided with the customary screw-thread $b$ on its end for connection with the shell of the cock or faucet. C is the removable shell of the cock or faucet, having screw-threads $c$ and valve-seat $c'$. D is the valve, $d$ the valve-stem, and D' the knob or handle. All these parts are or may be of any suitable or customary construction.

E is the supplemental valve, the same being preferably a ball-valve. It is located back of the main valve D and removable shell C and operates to close the water-pipe when the shell C and the main valve D, carried by it, are removed, but not when said shell and valve are in place.

F is the supplemental hollow stem or thimble, having internal screw-threads $f$ for connection with the valve-shell C and external screw-threads $f'$ at its shouldered end for connection with the hollow stem or base-piece B of the cock or faucet. The valve-seat $f^2$ for the supplemental valve is preferably formed in the supplemental hollow stem or thimble F.

G is the extension or projection on or engaged by the removable portion of the cock or faucet and which by its engagement with the supplemental valve E causes the same to remain normally unseated, thus leaving the water free to flow through the cock or faucet when the removable shell C is screwed home or in place. For convenience this extension or projection is preferably connected to the stem $d$ of the main valve, to which it is or may be screw-threaded. To prevent the supplemental or automatic check-valve E from closing the pipe A by atmospheric pressure or suction when the water-supply is shut off at the shut-off valve in the main water-supplying pipe and the pipe A is being drained to prevent freezing, I provide the hollow stem or base-piece B with one or more internal ribs or projections or other device $b'$—as, for example, a piece of wire—for preventing the ball E from fitting water-tight in said hollow stem or base-piece.

As in my invention the shell C, valve D, and hollow stem or base-piece B may be combined with the supplemental valve E and supplemental thimble F and extension or projection G without requiring any change in the construction of said parts B C D, it will be seen that my invention may be readily and cheaply applied to cocks or faucets already in use by simply adding said parts E F G and the piece of wire $b'$, all of which are so simple in form that they may be furnished at very slight cost.

The operation of my invention is as follows: When it is desired to repack or repair the main valve of the cock or faucet, all that is required is simply to unscrew the shell C and remove it, the mere act of unscrewing and removing it permitting the valve or ball E to seat itself and close the pipe automatically by the water-pressure, as the extension or projection G no longer holds said valve E unseated or open, and when the shell C is again screwed in place this causes the extension or projection G to again unseat or open the supplemental valve E and hold it normally in this position, so that the cock or faucet now again operates in the usual way.

In Fig. 1 the rib or projection $b'$ is shown in full lines as being made integral with the base-piece B and in dotted lines as being made in a separate piece from the base or stem B—as, for example, of a piece of bent wire.

Where my invention is to be applied to old cocks or faucets already in use, I prefer to employ the separate piece or removable rib $b'$, as shown in the dotted lines; but where my invention is used in cocks or faucets specially manufactured for embodying it I prefer to employ the integral construction of rib $b'$ and shown in the full lines in said figure.

I claim—

1. In a cock or faucet, the combination with the hollow imperforate base-piece B, of valve-shell C, valve D, supplemental valve E, supplemental screw-threaded thimble F, and removable extension or projection G, substantially as specified.

2. In a cock or faucet, the combination with the hollow imperforate base-piece B, of valve-shell C, valve D, supplemental valve E, supplemental screw-threaded thimble F, extension or projection G, and a device $b'$ in said base-piece B to prevent valve E fitting water-tight therein, substantially as specified.

3. In a cock or faucet, the combination with the removable screw-threaded valve-shell having a valve-seat, and a reciprocating main valve and valve-stem, of an imperforate stem or base-piece, a supplemental hollow stem or thimble screw-threaded thereto and to said valve-shell and provided with a valve-seat at its end connecting with said base-piece, and a supplemental valve in said base-piece held normally open or unseated and automatically seating itself when the removable shell and main valve are removed, substantially as specified.

4. In a cock or faucet, the combination with the removable screw-threaded valve-shell having a valve-seat, and a reciprocating main valve and valve-stem, of an imperforate hollow stem or base-piece, a supplemental hollow stem or thimble having internal screw-threads at one end connecting it with said valve-shell, said supplemental hollow stem or thimble having its opposite end shouldered and furnished with external screw-threads connecting it with said base-piece and provided at said end with a valve-seat, a supplemental valve in said base-piece held normally open or unseated and automatically seating itself when the removable shell and main valve are removed, and an extension or projection for holding said supplemental valve normally open or unseated when the main valve and shell are in place, substantially as specified.

5. In a cock or faucet, the combination with the base-piece B, of valve-shell C, valve D, supplemental valve E, supplemental screw-threaded thimble F, and extension or projection G screw-threaded to the stem of the main valve, substantially as specified.

ANGELO MARUBIO.

Witnesses:
H. M. MUNDAY,
EDW. S. EVARTS.